(12) United States Patent
Pahle

(10) Patent No.: US 8,613,347 B2
(45) Date of Patent: Dec. 24, 2013

(54) ARRANGEMENT OF A BRAKE DISC ON A WHEEL HUB

(75) Inventor: Wolfgang Pahle, Bad Wiessee (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 385 days.

(21) Appl. No.: 12/895,468

(22) Filed: Sep. 30, 2010

(65) Prior Publication Data

US 2011/0067963 A1 Mar. 24, 2011

Related U.S. Application Data

(63) Continuation of application No. PCT/EP2009/002396, filed on Apr. 2, 2009.

(30) Foreign Application Priority Data

Apr. 4, 2008 (DE) .......................... 10 2008 017 360

(51) Int. Cl.
*F16D 65/12* (2006.01)

(52) U.S. Cl.
USPC ............... 188/218 XL; 188/18 A; 188/218 R; 188/17; 324/173

(58) Field of Classification Search
USPC ........... 188/218 XL, 218 R, 18 A, 17, 1.11 R, 188/1.11 E; 301/105.1, 6.8; 310/168; 324/173, 174; 384/448; 73/494, 488
See application file for complete search history.

(56) References Cited

U.S. PATENT DOCUMENTS

| 3,626,226 | A | * | 12/1971 | Pauwels et al. | ............... 310/168 |
| 5,332,065 | A | * | 7/1994 | Steele et al. | ................ 188/18 R |
| 6,032,768 | A |  | 3/2000 | Ebbinghaus | |
| 6,619,440 | B2 | * | 9/2003 | Antony et al. | ................. 188/17 |
| 6,945,367 | B1 | * | 9/2005 | Yuhas | ..................... 188/18 R |
| 7,219,778 | B2 | * | 5/2007 | Pete et al. | .............. 188/218 XL |
| 7,487,862 | B2 | * | 2/2009 | Carlson et al. | .......... 188/218 XL |
| 7,779,969 | B2 | * | 8/2010 | Gonska | ...................... 188/18 A |
| 7,963,375 | B2 | * | 6/2011 | Pahle | ..................... 188/218 XL |
| 7,980,367 | B2 | * | 7/2011 | Hester | .................... 188/218 XL |
| 7,997,391 | B2 | * | 8/2011 | Burgoon et al. | ........ 188/218 XL |

(Continued)

FOREIGN PATENT DOCUMENTS

| DE | 10237504 A1 | * | 3/2004 |
| DE | 10 2004 034 361 B3 | | 2/2006 |

(Continued)

OTHER PUBLICATIONS

International Search Report dated Sep. 29, 2009 including English translation (Four (4) pages).

*Primary Examiner* — Thomas J Williams
*Assistant Examiner* — Mariano Sy
(74) *Attorney, Agent, or Firm* — Crowell & Moring LLP

(57) ABSTRACT

An arrangement of a brake disc on a wheel hub, in particular a hub of a utility vehicle, having multiple support elements distributed on the inner circumference of the brake disc which correspond to drivers disposed on the outer circumference of the wheel hub. Securing elements which press against both the drivers and also adjacent support elements to axially secure the brake disc are provided. A rotor is disposed in the attachment area of the brake disc on the wheel hub, the rotor having attachment parts for axial and twist-locked fixing which each engage behind the securing elements.

11 Claims, 3 Drawing Sheets

(56) References Cited

U.S. PATENT DOCUMENTS 8,191,973 B2 * 6/2012 Pahle et al. ............ 301/105.1
2007/0175715 A1    8/2007 Pahle
2009/0218183 A1 * 9/2009 Burgoon et al. ........ 188/218 XL

FOREIGN PATENT DOCUMENTS

DE    10 2005 056 063 A1    5/2007
EP              0 849 487 A2    6/1998
WO    WO 2007/041518 A2    4/2007

* cited by examiner

ARRANGEMENT OF A BRAKE DISC ON A WHEEL HUB

CROSS-REFERENCE TO RELATED APPLICATIONS

This application is a continuation of PCT International Application No. PCT/EP2009/002396, filed Apr. 2, 2009, which claims priority under 35 U.S.C. §119 from German Patent Application No. DE 10 2008 017 360.6, filed Apr. 4, 2008, the entire disclosures of which are herein expressly incorporated by reference.

BACKGROUND AND SUMMARY OF THE INVENTION

The invention relates to an arrangement of a brake disc on a wheel hub.

To connect a brake disc to a wheel hub and transmit a braking torque which arises during braking to the wheel hub and hence to a connected vehicle wheel, intermeshing tooth-shaped positive engagement means are known, consisting of support elements provided on the inner circumference of the brake disc and of drivers disposed on the outer circumference of the wheel hub and corresponding to said support elements to give an anti-twist lock.

To secure the brake disc axially on the wheel hub, there are known support elements which are designed as leaf springs and are each, on the one hand, screw-fastened to a driver and, on the other hand, rest with a spring pressure against the adjacent support elements of the brake disc by means of their wings, which extend on both sides of the bolt.

Disposed in the area in which the brake disc is connected to the wheel hub, there is generally a magnet wheel, which is employed as a functional component of an anti-lock system (ABS). Here, the magnet wheel, which is in operative connection with a sensor, is fastened to the wheel hub in a manner secure against twisting.

This can be accomplished by bolting, for example, as known from German Patent Document No. DE 10 2004 034 361 B3.

Other approaches to fastening include fixing the magnet wheel in a hole in the wheel hub or directly on the latter by means of a pressed joint, for example.

However, this joint is problematic since differences in the thermal expansion of the magnet wheel and the wheel hub and/or brake disc mean that there is a risk of loosening, severely impairing the ability to function of the anti-lock system overall. To compensate for these differences in thermal expansion, German Patent Document No. DE 10 2005 056 063 A1, for example, proposes to employ a spring sleeve.

Whatever the case may be, the mounting of the magnet wheel close to the brake disc is problematic, especially in the case of a neckless brake disc of the type in question, owing to the frictional heat which arises during braking, and this is an obstacle to permanently reliable operation of the system.

It is the underlying object of the invention to develop an arrangement of the type in question in such a way that the magnet wheel can be fastened without additional effort on assembly and that the service life of the magnet wheel connection is improved.

This object is achieved by an arrangement which meets the requirements set in all respects. In particular, the magnet wheel's ability to function is assured, even in extremely difficult operating conditions, i.e. high thermal loads, because there is always a reliable connection between the magnet wheel and the wheel hub or brake disc.

Since the components forming an arrangement according to the invention are, in their totality, a system relevant to safety, said improvement is of particular significance.

However, the invention is also distinguished from the prior art in a special way in economic terms.

Thus, the first point to be emphasized is that now no special measures are required for fastening the magnet wheel.

There is no need either to introduce additional threaded holes into the wheel hub, as is the case with the prior art cited, or to make provision in terms of production engineering in order to press together the magnet wheel and the corresponding component, for example.

This naturally leads to a significant reduction in costs, and, what is more, the simplified way in which the magnet wheel can be removed also contributes to this result.

To achieve this, all that is required is to undo the corresponding connecting element, i.e. the bolt, by which the securing element, i.e. the leaf spring mentioned, is held on the corresponding driver of the wheel hub, in order to replace a damaged magnet wheel, for example.

In addition, the magnet wheel can be produced without additional production measures. All that is required is to fit the attachment parts, which are preferably designed as attachment tabs and are expediently integrally formed. In this case, all that is necessary is appropriate forming work, of the type that usually has to be carried out in any case for the purpose of forming the magnet wheel.

According to an advantageous development of the invention, the drivers associated with the attachment tabs have recesses, in which the tabs rest, and the shape and dimensions of the recesses are matched at least in a certain section or certain sections to those of the respective attachment tabs.

It is thereby possible to achieve anti-twist locking of the magnet wheel by forming, while axial retention is accomplished through the clamping provided by the leaf springs, which partially overlap the attachment tabs.

According to another concept forming part of the invention, the attachment parts, preferably said attachment tabs, are angled approximately in an L shape and disposed on the outer rim of the magnet wheel, with a small number disposed at angular intervals equal to the intervals at which the wheel hub drivers, in which the attachment tabs rest, are positioned being sufficient in principle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
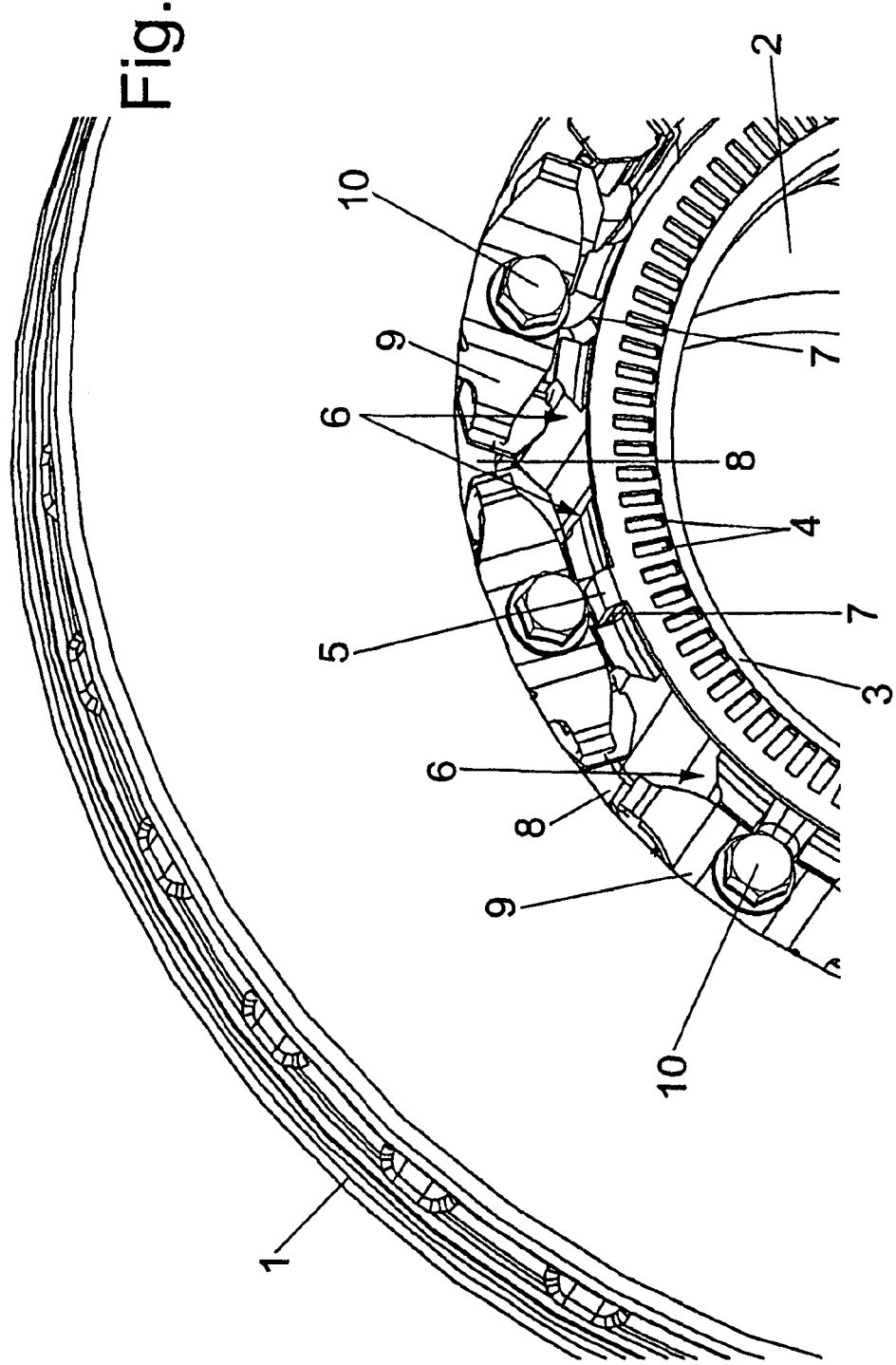
FIG. 1 shows a detail of an arrangement designed in accordance with an embodiment of the invention in a perspective front view.
Figure 2:
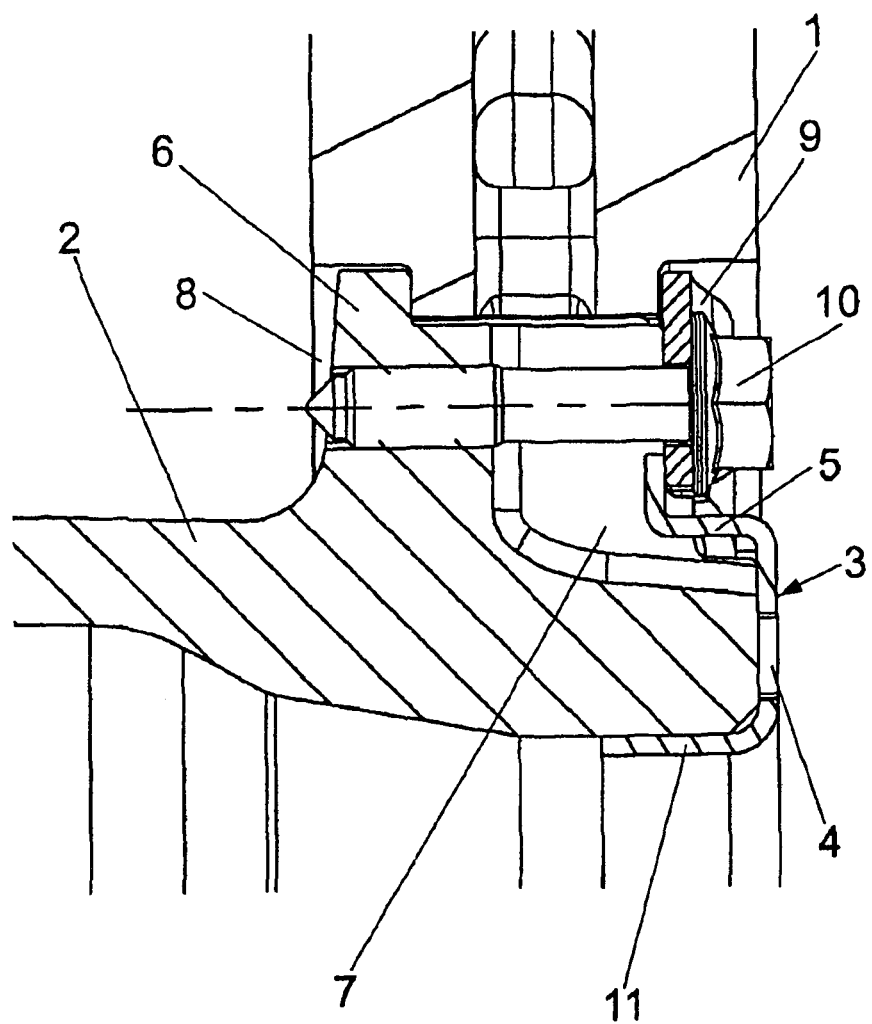
FIG. 2 shows a longitudinal section through the arrangement of FIG. 1, likewise in the form of a detail.

FIGS. 1 and 2 show an arrangement of a brake disc 1 on a wheel hub 2 of a utility vehicle, in which the wheel hub 2 has drivers 6 distributed uniformly around the outer circumference, said drivers being disposed at a distance apart and in practice forming a tooth system.

Engaging in the gaps formed are support elements 8, which are disposed on the inner circumference of the brake disc 1 and, through their correspondence to the drivers 6, form an anti-twist lock for the brake disc 1 on the wheel hub 2.

To fix the brake disc 1 axially, securing elements 9 in the form of leaf springs are provided on one side, each of said securing elements being fastened to the wheel hub 2 by a bolt 10, which is screwed into a driver 6.

Wings of the securing element 9, which extend on both sides of the bolt 10, rest against the support elements 8 adjacent to the driver 6.

Mounted on the free end of the wheel hub 2, that faces the securing elements 9, is a magnet wheel 3, which is provided with punched-out apertures 4, which correspond in operation to a fixed sensor (not shown) and jointly form parts of an anti-lock system.

On its inner circumference, the magnet wheel 3 furthermore has an encircling leg 11, which rests against the inner wall of the wheel hub 2, thus ensuring that the magnet wheel 3 is supported radially.

Figure 3:
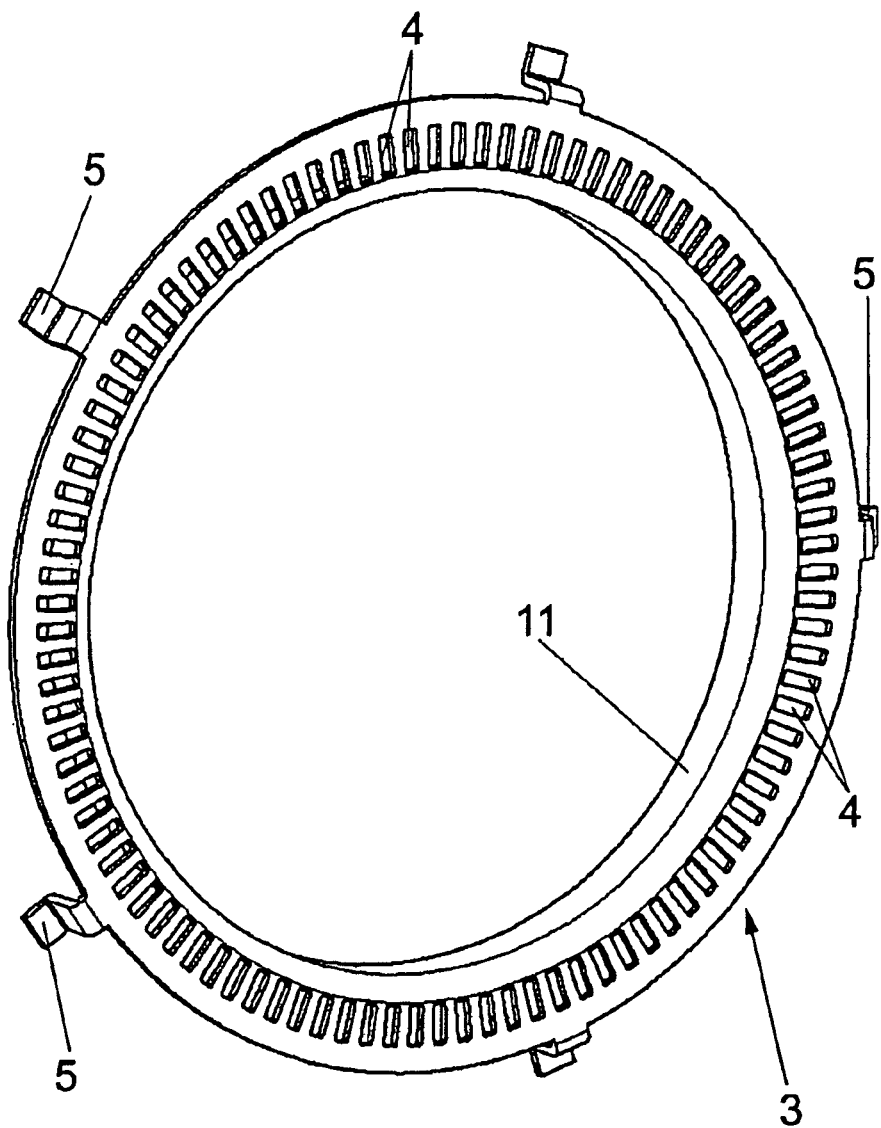
FIG. 3 shows a magnet wheel according to the FIG. 1 embodiment of the invention in a perspective view.

To secure the magnet wheel 3 against twisting and secure it axially, a plurality of attachment parts in the form of angled attachment tabs 5 are formed on the outer circumference, this being very clearly visible in FIG. 3, in particular.

These attachment tabs 5 each rest in a recess 7 in a driver 6, the width of which corresponds to the width of the attachment tab 5.

A leg of the attachment tab 5 extends radially and engages behind the securing element 9, i.e. this leg rests against the rear side of the securing element 9, the attachment tab 5 and hence the magnet wheel 3 as a whole thus being clamped.

It is expedient to provide a smaller number of attachment tabs 5 than securing elements 9, something that at least makes removal of the magnet wheel 3 easier since a correspondingly small number of bolts 10 then have to be undone in order to undo the fixing provided by the securing elements 9. In this arrangement, the attachment tabs 5 are preferably disposed at uniform angular intervals relative to one another.

TABLE OF REFERENCE NUMERALS 1 brake disc
2 wheel hub
3 magnet wheel
4 aperture
5 attachment tab
6 driver
7 recess
8 support element
9 securing element
10 bolt
11 leg The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement of a brake disc on a wheel hub, comprising:
   a plurality of support elements distributed on an inner circumference of the brake disc;
   a plurality of drivers disposed on an outer circumference of the wheel hub;
   a plurality of fasteners;
   a plurality of securing elements; and
   a magnet wheel,
   wherein
       the plurality of support elements and the plurality of drivers are arranged to cooperate to lock the brake disc and the wheel hub relative to one another in a circumferential direction,
       the securing elements each abut at least one of the plurality of drivers and at least one of the plurality of support elements and are connected to the at least one of the plurality of drivers by at least one of the plurality of fasteners so as to axially secure the brake disc on the wheel hub along an axis of rotation of the brake disc, and
       the magnet wheel is disposed on the wheel hub in an attachment area of the securing elements such that at least one attachment part of the magnet wheel extends behind at least one of the securing elements to lock the magnet wheel to the brake disc and wheel hub in the circumferential direction and along the axis of rotation of the brake disc without penetration of the at least one attachment part of the magnet wheel by the at least one of the plurality of fasteners.

2. The arrangement as claimed in claim 1, wherein the at least one attachment part is configured as an attachment tab.

3. The arrangement as claimed in claim 2, wherein the at least one attachment tab is formed on an outer rim of the magnet wheel.

4. The arrangement as claimed in claim 3, wherein the at least one attachment tab has a radially outward leg portion extending a distance sufficient to overlap a rear side of the at least one of the securing elements.

5. The arrangement as claimed in claim 4, wherein the at least one attachment tab is located in a recess in the at least one of the plurality of drivers.

6. The arrangement as claimed in claim 5, wherein a width of the recess corresponds to a width of the at least one attachment tab.

7. The arrangement as claimed in claim 1, wherein the magnet wheel includes an axially extending leg arranged to abut an inner wall of the wheel hub to radially locate the magnet wheel.

8. The arrangement as claimed in claim 2, wherein the at least one attachment tab is one of a plurality of attachment tabs which are disposed at uniform angular intervals relative to one another.

9. The arrangement as claimed in claim 2, wherein the at least one attachment tab is subjected to a clamping force by the at least one securing element.

10. The arrangement as claimed in claim 6, wherein the recess is provided centrally in the driver.

11. The arrangement as claimed in claim 10, wherein
    the recess is arranged on a common radial axis with a threaded hole which receives a fastener fixing the at least one securing element to the wheel hub.

* * * * *